United States Patent [19]

Rickabaugh

[11] Patent Number: 5,239,774
[45] Date of Patent: Aug. 31, 1993

[54] PLANTER SYSTEM WITH CHANGE-CONFIGURATION, POP-OUT IMITATOR STRUCTURE

[75] Inventor: Heidi S. Rickabaugh, Portland, Oreg.

[73] Assignee: White Swan, Ltd., Beaverton, Oreg.

[21] Appl. No.: 719,375

[22] Filed: Jun. 24, 1991

[51] Int. Cl.$^5$ ............................................. A01G 9/02
[52] U.S. Cl. .................................... 47/66; 47/72; 229/8
[58] Field of Search ............... 47/66, 72, 67; 206/423, 206/457; 229/8

[56] References Cited

U.S. PATENT DOCUMENTS

| | | |
|---|---|---|
| 12,250 | 7/1906 | Pinner . |
| D. 130,497 | 11/1941 | Block . |
| D. 140,213 | 1/1945 | Miller . |
| D. 141,200 | 5/1945 | Bauer . |
| D. 232,048 | 7/1974 | Bamesberger . |
| D. 245,682 | 9/1977 | Thomas ................................. 47/66 |
| 561,824 | 6/1896 | Siskron ................................. 47/66 |
| 1,610,652 | 12/1926 | Bouchard ............................. 47/72 |
| 1,697,751 | 1/1929 | Blake ................................... 47/72 |
| 2,355,559 | 8/1944 | Renner ................................. 47/72 |
| 2,440,569 | 4/1948 | Baldwin . |
| 2,845,735 | 8/1958 | Werner ................................. 47/72 |
| 4,795,398 | 1/1989 | Wexler . |
| 4,914,860 | 4/1990 | Richardson . |

FOREIGN PATENT DOCUMENTS

| | | | |
|---|---|---|---|
| 63513 | of 1914 | Fed. Rep. of Germany | 47/72 |
| 3426592 | 1/1986 | Fed. Rep. of Germany | 47/72 |
| 384764 | of 1908 | France | 47/72 |

*Primary Examiner*—Ramon S. Britts
*Assistant Examiner*—Joanne C. Downs
*Attorney, Agent, or Firm*—Kolisch, Hartwell, Dickinson, McCormack & Heuser

[57] ABSTRACT

A planter system featuring a planting container which is adapted to contain planting-soil material and a packet of selected seeds, and around which container is supported a change-configuration jacket structure. The jacket structure includes a sleeve which extends about the container, and pop-out structure which can be shifted from a stored to a non-stored extending condition to imitate, with the other components, visually, yet another structure, such as a teapot, a flower-watering can, an animal form, or others.

7 Claims, 2 Drawing Sheets

PLANTER SYSTEM WITH CHANGE-CONFIGURATION, POP-OUT IMITATOR STRUCTURE

BACKGROUND AND SUMMARY OF THE INVENTION

This invention relates to a useful and decorative planter system featuring change-configuration, pop-out visual imitator structure, and also to pop-out imitator structure which is used in such a system in cooperation with a planting-soil-and seed packet-containing planting container.

Over many years, there has developed in this and other countries a strong and growing interest in decorating homes, offices and many other spaces with living plant material in visually pleasing containers. In particular, there has developed a significant attraction to planting from seed, nurturing, and caring for resulting plant material. Not only have these interests blossomed with respect to systems and plant materials which are, strictly speaking, solely visually decorative, but also there is a large interest in raising and carrying for leafing and flowering edible, or otherwise food and beverage related, plant substances.

The present invention focuses attention on this substantial interest by proposing an extremely simple, elegant, satisfying and highly visually attractive planter system which offers not only the pleasure of growing selected plant materials from seeds, in what might be thought of as a self-contained, ready-to-start organization, but also a system which, at extremely low cost, and with great simplicity, offers a visually pleasing plant container and an imitator jacket structure for the container.

An important object of the present invention, which augments the object of providing a system of the type just outlined above, is to offer the same in a relatively low-cost, easily handled and simple-to-use form.

These and various other objects and advantages which are offered and promoted by the present invention will become more fully apparent as the description which now follows is read in conjunction with the accompanying drawings.

DETAILED DESCRIPTION OF, AND BEST MODE FOR CARRYING OUT, THE INVENTION

Turning now to the drawings, and referring first of all to FIGS. 1-6, inclusive, indicated generally at 10 is a planter system including change-configuration, pop-out visual imitator structure constructed in accordance with the present invention. Included in system 10 are a planting container 12 and what is referred to herein as a change-configuration jacket structure 14 (see particularly FIGS. 1, 2, and 5).

Figure 4:
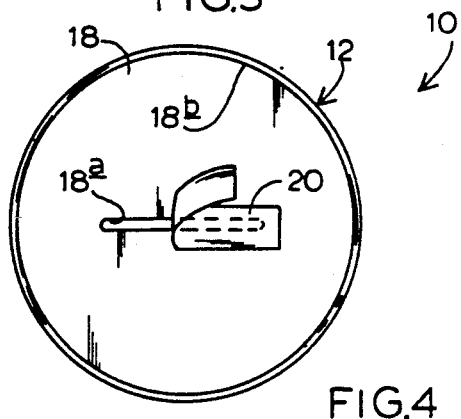
FIG. 4 is a plan view taken from the bottom side of FIG. 1 illustrating a drainage port in the base of the container, with an adhered sealing strip partially peeled away to expose the port.

Container 12, as can be seen, is disclosed herein as being generally cylindrical in construction with a removable circular lid 16, and a circular base 18 which, as can be seen in FIG. 4, is provided with an elongate, slot-like drainage port 18a which, prior to use of system 10, is sealed by a removable adhesive strip 20—shown partially peeled away in FIG. 4 to expose port 18a.

Figure 6:
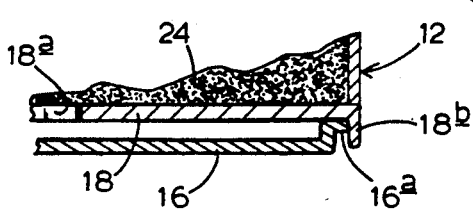
FIG. 6 is an enlarged, fragmentary, cross-sectional detail, taken generally in the region of the two curved arrows shown at 6—6 in FIG. 5, illustrating nestled drainage cooperation which exists between the container and a removable lid therefor.

Focusing attention for a moment on FIGS. 3, 4, 5 and 6, lid 16 has a somewhat dish-like construction, with a radially outwardly projecting perimetral flange 16a which is adapted to fit within the downwardly projecting rim 18b that defines the perimeter of base 18. In FIG. 6, lid 16 is shown in a condition spaced below base 18, and about to be seated or nestled upwardly within rim 18b. In FIG. 6, the nestled condition is shown. This arrangement conveniently permits removed lid 16 to act as a drainage collector beneath port 18a for water which is introduced, as will be mentioned shortly, into the inside of container 12.

Figure 2:
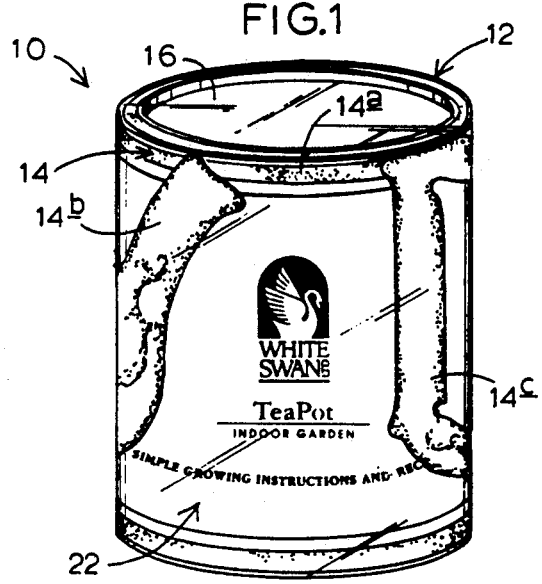
FIG. 2 is a perspective view taken from the back side of the system of FIG. 1, all other conditions being the same as those shown in FIG. 1.

Jacket structure 14 includes a cylindrical sleeve 14a which extends snugly about the cylindrical portion of container 12, and pop-out visual imitator structure including a pair of pop-out elements 14b, 14c. In the condition in which system 10 is shown in FIGS. 1-4, inclusive, and with the exception of the partially peeled away status illustrated for strip 20 in FIG. 4, all components are shown in the conditions in which they arrive in the hands of the prospective user. In this condition, the two elements in the pop-out structure are folded against and adjacent the part of sleeve 14a which is shown in FIG. 2, and are held in this stored condition preferably by a suitable transparent shrink-wrap-like material. In this condition of the system, an appropriate instructional booklet 22 is gripped against the side of the sleeve between elements 14b, 14c.

Figure 5:
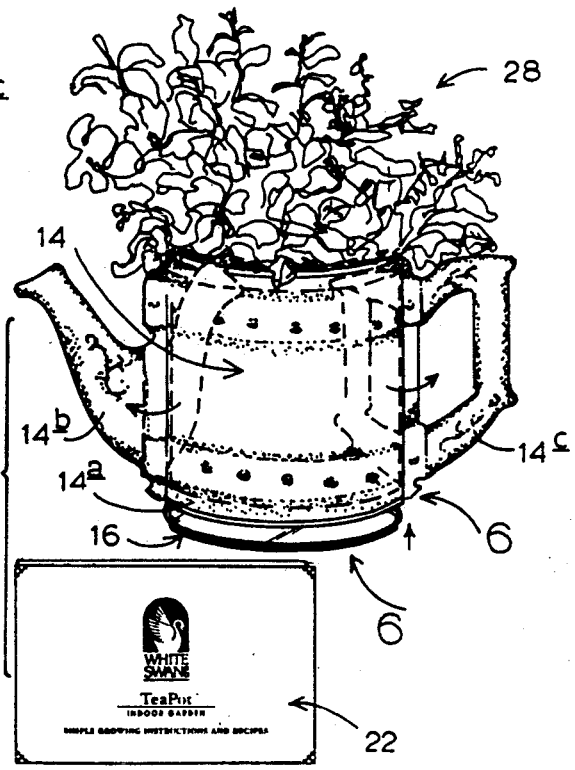
FIG. 5 is a reduced-scale view illustrating components in the proposed planter system in conditions which exist after the same is opened for and in use, and in addition, after planted seeds have sprouted and developed to produce plant material.

FIGS. 5 and 6 in the drawings illustrate certain conditions which exist in the system after the same has been "opened up" for use. In this situation, shrink wrap material has been removed, and the elements in the pop-out structure have been folded out (to a non-stored condition) to cooperate with the sleeve and with the body of container 12 to imitate, visually, yet another kind of structure. Lid 16 is removed and placed for drainage assistance beneath port 18a which, by this time, has been opened, and booklet 22 is removed for reference by the user. In the particular embodiment now being discussed, pop-out element 14b takes the form of a pouring spout, and element 14c, the form of a handle, both of which components cooperate with sleeve 14a and container 12 to imitate a liquid-pouring structure in the general form and appearance of a teapot. Preferably, the now exposed surfaces of the imitator structure reveal suitable printed patterning which enhances the visual attractiveness for the teapot-imitating structure.

Figure 1:
FIG. 1 is a top, front-side, perspective view illustrating a planter system constructed in accordance with the present invention, with the same shown in the manner that it appears to a user in a pre-use condition.
Figure 3:
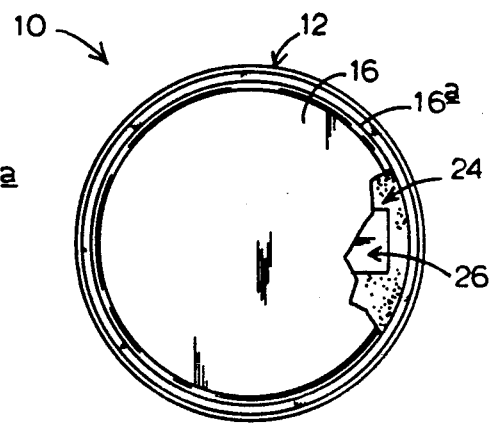
FIG. 3 is a plan view taken from the top side of FIG. 1, with a fragmentary portion removed to reveal contents of a container in the system.

Referring for a moment to FIG. 3, contained within container 12 is a suitable supply 24 of a planting-soil material, entirely conventional in composition, and in addition, a packet 26 of a pre-selected category of plant seeds. While, clearly, various selected categories of seeds may be used and provided in system 10, an interesting feature of the embodiment now being described is that packet 26 contains geeds which, when planted in soil 24 and appropriately watered, will germinate and blossom into herbs that are usable for seasoning tea. This growth product is illustrated generally at 28 in FIG. 16. There is thus, ultimately, and in the situation now being described, a strong connective relationship extant between the category of the plant material and the character of the imitated structure.

Typical use of system 10 from the time of purchase should be readily apparent. The user removes the shrink wrap, pops out the pop-out elements, separates the instruction booklet for use, and removes lid 16. The lid is placed beneath the base 18 in the manner illustrated in FIGS. 5 and 6, seeds from packet 26 are planted in the soil material, and water is added as needed. Excess water, if such exists, drains conveniently from port 18a into the "dish" portion of lid 16, from which it evaporates or is emptied. The pop-out structure along with the sleeve and the underlying container cooperate pleasingly to imitate another structure, and the entirety thereof cooperates, ultimately, with developed plant growth to produce an overall visually pleasing and useful assembly.

Figure 7:
FIGS. 7, 8 and 9 illustrate, on one sheet, three different, currently proposed embodiments for the system of the invention, with the uppermost figure illustrating the embodiment shown in FIGS. 1-6, inclusive, namely, one with a "teapot" imitator structure, the middle view illustrating a system with "flower-watering-can" imitator structure, and the bottom view illustrating a system with an "animal-form" (chicken) imitator structure.
Figure 8:
Figure 9:

The second plate of drawings, which includes FIGS. 7, 8 and 9, shows three currently proposed, specific embodiments of the system of the invention. In particular, it shows these three embodiments looked at from similar points of view with plant material fully generated. FIG. 7 illustrates the embodiment which has been described so far in conjunction with FIGS. 1-6, inclusive. FIG. 8 shows at 30 yet another embodiment of the system wherein the imitated structure takes the form of a flower-watering can. Plant material here, shown at 32 takes the form of edible flowers, something which such a watering can, in real life, might well be used to tend. FIG. 9 illustrates at 34 a system featuring an imitation of an animal form, herein a chicken, with the head portion shown on the right side of FIG. 9 and the tail portion shown on the left side of this figure. Plant material 36 illustrated here takes the form of seasoning herbs useful in cooking, and thus also has a category which is related, in a sense, to the character of the structure imitated.

Thus a preferred embodiment (in several slight variations) has been illustrated and described herein which effectively meets the interests and objectives set forth earlier. And, while three specific imitated structures have been addressed in the description above, one should recognize that the planter system of the invention, and the jacket imitator structure therein, could be expressed in a variety of different specific forms. So, also, could the contained plant material differ from the several examples given above.

Accordingly, one should recognize that variations and modifications may be made without departing from the spirit of the invention.

It is claimed and desired to secure by Letters Patent:

1. A planter system featuring change-configuration visual imitator structure comprising
   a container adapted to contain a planting-soil material for receiving selected plant seeds, and
   change-configuration jacket structure mounted on said container including a sleeve extending at least partially about said container, and pop-out structure joined to said sleeve adjustable between a stored condition folded adjacent and against, and in such condition generally topographically congruent and conformal with, the sleeve, and a non-stored, extending condition, in which latter condition the pop-out structure becomes topographically non-congruent and non-conformal with the sleeve, and, together with the sleeve, cooperates with said container to imitate, visually, yet another structure.

2. The system of claim 1, wherein said pop-out structure includes a pair of pop-out elements, one of which imitates a pouring spout, and the other of which imitates a carrying handle, said elements, along with said sleeve, cooperating with said container to imitate a liquid-pouring structure.

3. The system of claim 1, wherein said pop-out structure includes a pair of pop-out elements one of which illustrates the head portion of an animal, and the other of which imitates the tail portion of the same animal, said elements along with said sleeve cooperating with said container to imitate such an animal.

4. A planter system featuring change-configuration visual imitator structure comprising
   a container including a removable lid and containing planting-soil material and a packet of selected plant seeds intended for planting in such material, and
   change-configuration jacket structure including a sleeve mounted on said container, and pop-out structure joined to said sleeve adjustable between a stored condition folded adjacent and against, and in such condition generally topographically congruent and conformal with, the sleeve, and a non-stored, extending condition, in which latter condition the pop-out structure becomes topographically non-congruent and non-conformal with the sleeve, and, together with the sleeve, cooperates with said container to imitate, visually, yet another structure.

5. The system of claim 4, wherein the seeds provided in said packet are intended to produce plant material of a certain category, and said yet another structure has a character that is related to such category.

6. The system of claim 4, wherein said container has a base with an openable drainage port, and said lid, in a removed condition, is designed to fit nestled beneath said base and to act there as a drainage collection structure.

7. Jacket imitator structure for use in a planting system including a planting container adapted to contain planting-soil material and seeds for planting therein, said imitator structure comprising
   a sleeve mountable on such a container, and joined to said sleeve
   pop-out structure adjustable, under circumstances with the imitator structure in place on a container, between a stored condition folded adjacent and against, and in such condition generally topographically congruent and conformal with, said sleeve, and a non-stored, extending condition, in which latter condition the pop-out structure becomes topographically non-congruent and non-conformal with the sleeve, and, together with the sleeve, interacts to imitate, when installed with such a container, visually yet another structure.

* * * * *